(12) United States Patent
Uenaka

(10) Patent No.: US 9,106,833 B2
(45) Date of Patent: Aug. 11, 2015

(54) BLUR CORRECTION APPARATUS

(71) Applicant: RICOH IMAGING COMPANY, LTD., Tokyo (JP)

(72) Inventor: Yukio Uenaka, Tokyo (JP)

(73) Assignee: RICOH IMAGING COMPANY, LTD., Tokyo (JP)

( * ) Notice: Subject to any disclaimer, the term of this patent is extended or adjusted under 35 U.S.C. 154(b) by 26 days.

(21) Appl. No.: 14/025,151

(22) Filed: Sep. 12, 2013

(65) Prior Publication Data

US 2014/0078329 A1 Mar. 20, 2014

(30) Foreign Application Priority Data

Sep. 14, 2012 (JP) ................. 2012-203594

(51) Int. Cl.
*H04N 5/232* (2006.01)
*G03B 5/00* (2006.01)

(52) U.S. Cl.
CPC .............. *H04N 5/23287* (2013.01); *G03B 5/00* (2013.01); *G03B 2205/0015* (2013.01); *H04N 5/23209* (2013.01); *H04N 5/23258* (2013.01)

(58) Field of Classification Search
CPC .................................................. H04N 5/23248
USPC ......................................... 348/208.7, 208.11
See application file for complete search history.

(56) References Cited

U.S. PATENT DOCUMENTS

| | | | |
|---|---|---|---|
| 5,761,546 A * | 6/1998 | Imada | 396/55 |
| 5,974,268 A | 10/1999 | Washisu | |
| 6,046,768 A | 4/2000 | Kaneda et al. | |
| 6,400,902 B1 * | 6/2002 | Usui | 396/55 |
| 7,295,770 B2 | 11/2007 | Uenaka et al. | |
| 7,755,666 B2 * | 7/2010 | Noji | 348/208.11 |
| 8,737,829 B2 * | 5/2014 | Shihoh | 396/55 |
| 2004/0017485 A1 * | 1/2004 | Ohishi | 348/208.99 |
| 2004/0022530 A1 * | 2/2004 | Okazaki et al. | 396/55 |

(Continued)

FOREIGN PATENT DOCUMENTS

| | | |
|---|---|---|
| JP | 2002-099017 | 4/2002 |
| JP | 2003-241247 A | 8/2003 |
| JP | 3780080 B2 | 5/2006 |

(Continued)

OTHER PUBLICATIONS

U.S. Appl. No. 14/025,165 to Yukio Uenaka, filed Sep. 12, 2013.

(Continued)

*Primary Examiner* — James Hannett

(74) *Attorney, Agent, or Firm* — Greenblum & Bernstein, P.L.C.

(57) ABSTRACT

A blur correction apparatus is provided that includes a blur correction mechanism, a locking member, a shift drive processor and an unlocking driver. The blur correction mechanism compensates for camera shake by driving a movable portion provided with one of a correction lens and an imaging device. The locking member restricts movement of the movable portion within a locked range of motion. The shift drive processor moves the movable portion a predetermined distance toward a center of the locked range of motion when locking by the locking member is released and the predetermined distance is shorter than the distance from the movable portion to the center. The unlocking driver moves the locking member to an unlocked position after moving the movable portion the predetermined distance away from the locking member.

7 Claims, 18 Drawing Sheets

(56) References Cited

U.S. PATENT DOCUMENTS

2004/0085639 A1   5/2004   Katagishi et al.
2005/0046975 A1   3/2005   Katagishi et al.

FOREIGN PATENT DOCUMENTS

| JP | 2008-026432 | 2/2008 |
| JP | 4649938 B2 | 3/2011 |
| JP | 2011-095489 A | 5/2011 |
| JP | 2011-164238 A | 8/2011 |
| JP | 2012-098747 A | 5/2012 |

OTHER PUBLICATIONS

Extended European Search Report from European Patent Office in European Patent Application No. 13184320.3, dated May 30, 2014.

* cited by examiner

BLUR CORRECTION APPARATUS

BACKGROUND OF THE INVENTION

1. Field of the Invention

The present invention relates to an optical blur correction apparatus which prevents the occurrence of image blur by moving a lens or an image sensor in accordance with the deviation of an optical axis caused by camera shake.

2. Description of the Related Art

Lens shift is known as one type of optical blur correction mechanism. In the lens shift type, a gyroscopic sensor and a correction lens are arranged in a lens barrel and image blur due to camera shake is canceled by driving the correction lens based on an output of the gyroscopic sensor. A movable portion on which the correction lens is mounted is loosely supported by a lens barrel body, for example by an elastic body, and the position of the movable portion is controlled within a specific range (range of motion) in a plane perpendicular to an optical axis by an electromagnetic actuator including a coil, a magnet, a yoke, and the like. The movable portion can move substantially freely within the range of motion. Therefore, due to gravity, the movable portion drops downward within the range of motion when blur correction control is in an OFF state and the center of the correction lens deviates from the optical axis.

Accordingly, a mechanical locking mechanism may be used to fix the movable portion in place by fitting a lock pin (locking member) into a lock hole formed in the movable portion. Namely, when the blur correction control is in an OFF state, the center of the correction lens is fixed on the optical axis by the locking mechanism. However, since there is play in such a mechanical locking mechanism, the correction lens can still deviate in the direction of gravity within the range of play when the blur correction control is suspended in a locked state. Accordingly, unintentional blur can occur instantaneously in a finder image or monitor image even in the locked state. To solve such a problem, US 2004/0017485 A1 discloses a system that detects the direction of gravity when the movable portion is locked and the correction lens is moved beforehand to the deviation position before the blur correction control is turned off.

SUMMARY OF THE INVENTION

Meanwhile, when a locking member is in contact with a movable portion, friction may obstruct a movement of the locking member toward an unlocked position during a release operation of the mechanical lock.

Therefore, one aspect of the present invention is to provide a blur correction system provided with a mechanical locking mechanism that can easily and rapidly release locking.

According to the present invention, a blur correction apparatus is provided that includes a blur correction mechanism, a locking member, a shift drive processor and an unlocking driver.

The blur correction mechanism compensates for camera shake by driving a movable portion provided with one of a correction lens and an imaging device. The locking member restricts movement of the movable portion within a locked range of motion. The shift drive processor moves the movable portion a predetermined distance toward a center of the locked range of motion when locking by the locking member is released and the predetermined distance is shorter than the distance from the movable portion to the center. The unlocking driver moves the locking member to an unlocked position after moving the movable portion the predetermined distance away from the locking member.

For example, the predetermined distance is equal to or less than 50% of the distance the movable portion is moved to the center. More preferably, the predetermined distance is equal to or less than 20% thereof. The movable portion is moved by the shift drive processor when blur correction starts.

Further, for example, the movable portion includes a circular frame portion and the locking member is a lock ring which surrounds the periphery of the circular frame portion. A plurality of protrusions is arranged on an outer circumference of the circular frame portion and a plurality of recesses corresponding to the plurality of protrusions is arranged on an inner circumference of the circular lock ring. The lock ring is movable between a locked position and unlocked position. In the locked position, movement of the movable portion is restricted by contact between the protrusions and the inner circumference of the circular lock ring. In the unlocked position, the protrusions are positioned in their respective recesses so that the movable portion is made movable for blur correction.

Further, it is preferable that the movable portion is suspended in a current position by the blur correction mechanism when a release operation is performed in a state in which the movable portion is locked by the locking member.

Further, the present invention provides a lens barrel that includes the blur correction mechanism, the locking member, the shift drive processor and the unlocking driver.

The blur correction mechanism compensates for camera shake by driving a movable portion provided with the correction lens. The locking member restricts movement of the movable portion within the locked range of motion. The shift drive processor moves the movable portion the predetermined distance toward the center of the locked range of motion when locking with the locking member is released. The predetermined distance is less than the distance from the movable portion to the center. The unlocking driver moves the locking member to the unlocked position after moving the movable portion by the predetermined distance away from the locking member.

DESCRIPTION OF THE PREFERRED EMBODIMENTS

Figure 1:
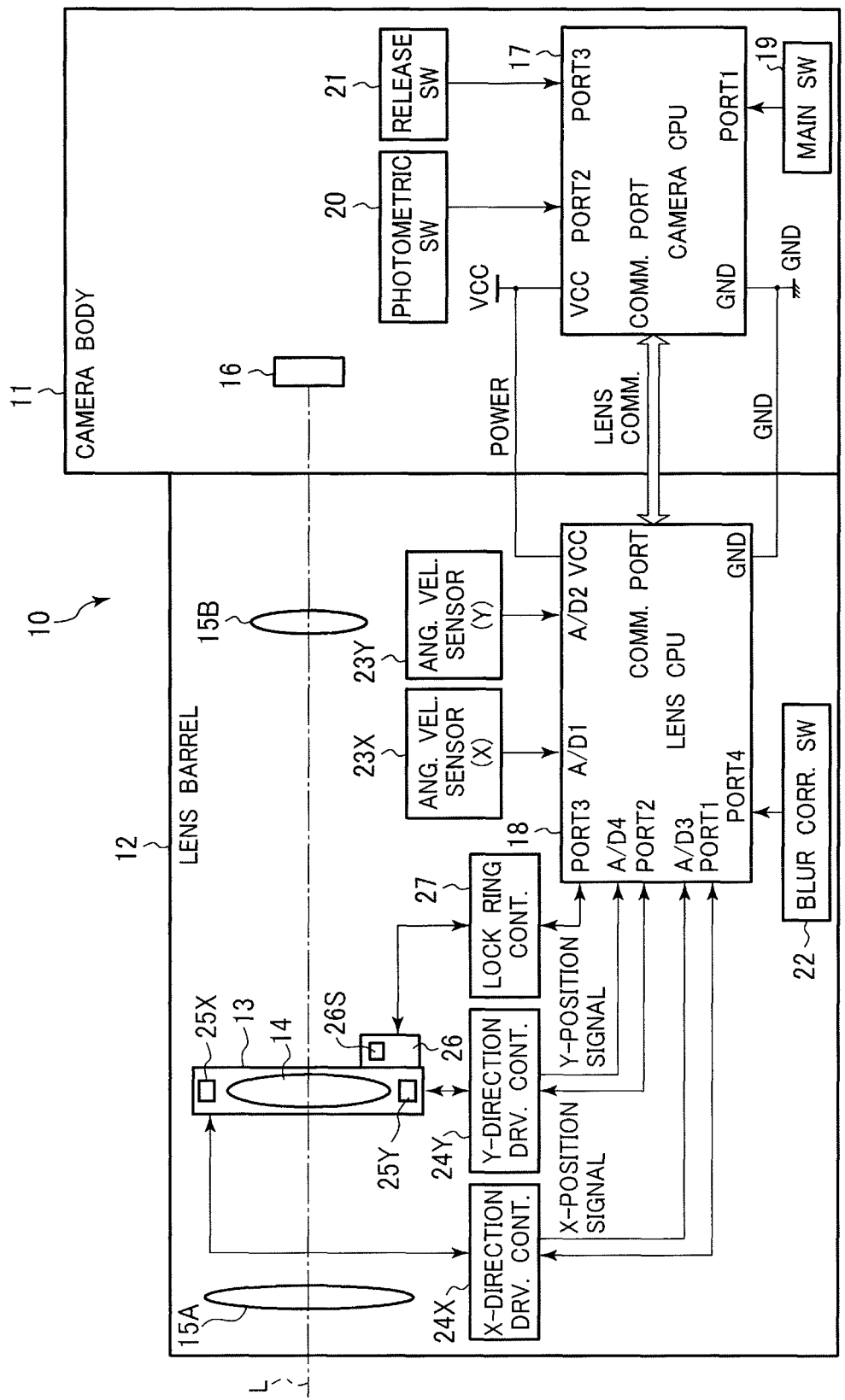
FIG. 1 is a block diagram schematically illustrating a structure of a camera of the present embodiment.

In the following, embodiments of the present invention will be described with reference to the drawings. FIG. 1 is a block diagram illustrating a structure of a camera on which a blur correction mechanism of a first embodiment of the present invention is mounted. In the drawing, only structures related to the present invention are schematically illustrated.

In the present embodiment, a camera 10 may be a digital single-lens reflex camera in which a lens barrel 12 is detachably attachable to a camera body 11. Further, in the present embodiment, a blur correction mechanism 13 is arranged in the lens barrel 12. That is, the blur correction mechanism 13 having a correction lens 14 for blur correction is configured between two imaging lenses 15A, 15B. Incident light from the imaging lens 15A, which passes along an optical axis L via the correction lens 14 and the imaging lens 15B, forms an image on an imaging device 16 in the camera body 11.

A camera CPU 17 and a lens CPU 18 are arranged in the camera body 11 and the lens barrel 12, respectively. The camera CPU 17 is connected to a main switch 19, a photometric switch 20, and a release switch 21. Further, the camera CPU 17 is connected to the lens CPU 18 through a plurality of electrodes of a lens mount (not illustrated) along with a power line and ground line. Here, the camera CPU 17 is connected to a variety of other devices for performing a variety of controls for the entire camera.

A blur correction switch 22 to turn a blur correction control ON/OFF is arranged in the lens barrel 12 and is connected to the lens CPU 18. Further, angular velocity sensors 23X and 23Y, which detect angular velocities about the Y and X axes, respectively, which are the vertical axis and horizontal axis of a camera and are perpendicular to the optical axis L, are arranged in the lens barrel 12. Signals detected by the angular velocity sensors 23X, 23Y are input to the lens CPU 18. When the blur correction control is ON, the lens CPU 18 calculates target positions where to move the correction lens 14 along the X and Y axes to compensate for camera shake based on angular velocities detected about the respective axes by the angular velocity sensors 23X and 23Y, and lens information 38 such as a focal length f.

The correction lens 14 is driven by electromagnetic interaction between a coil (not illustrated) arranged on a movable portion 28 that holds the correction lens 14, and a yoke arranged on a fixed portion that is fixed to the lens barrel 12, for example. Current supplied to the coil is controlled by an X-direction drive controller 24X and a Y-direction drive controller 24Y. Position sensors 25X, 25Y using Hall elements or the like, for example, are arranged at the movable portion 28 which holds the correction lens 14, so that a position of the correction lens 14 is detected for feedback to the lens CPU 18. That is, the lens CPU 18 calculates an amount of current supplied to the coil from the target positions of the correction lens 14 that are calculated based on the signals of the angular velocity sensors 23X, 23Y and the current positions of the correction lens 14 obtained from the position sensors 25X, 25Y. The CPU 18 then outputs the amounts of current to the X-direction drive controller 24X and the Y-direction drive controller 24Y.

The blur correction mechanism 13 is provided with a mechanical locking mechanism 26 and a lock detection sensor 26S to detect locking status. The locking mechanism 26 is for maintaining the center of the correction lens 14 on the optical axis L and is controlled by a lock ring controller 27 based on instructions from the lens CPU 18. The current locking status is indicated to the lens CPU 18 by the lock detection sensor 26S.

Here, a communication port of the lens CPU 18 and a communication port of the camera CPU 17 are connected through the electrodes of the lens mount, as described above. Data communication is performed there between, as described later.

Figure 2A:
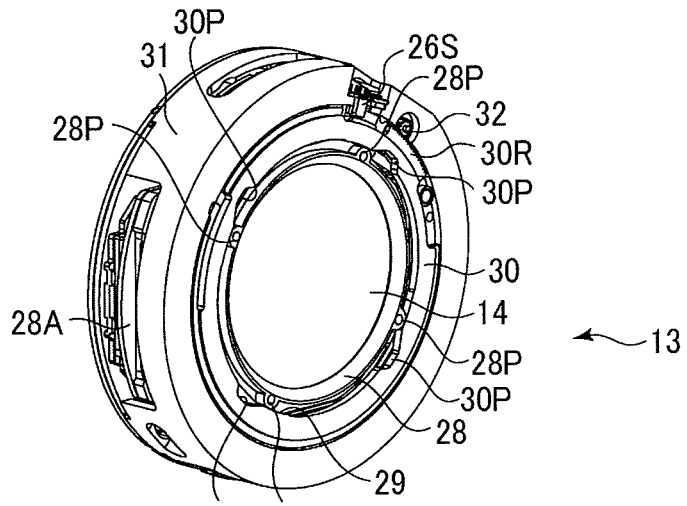
FIGS. 2A-2C include a perspective front view of a blur correction mechanism of the present embodiment, a front view in an unlocked state, and a front view in a locked state.
Figure 2B:
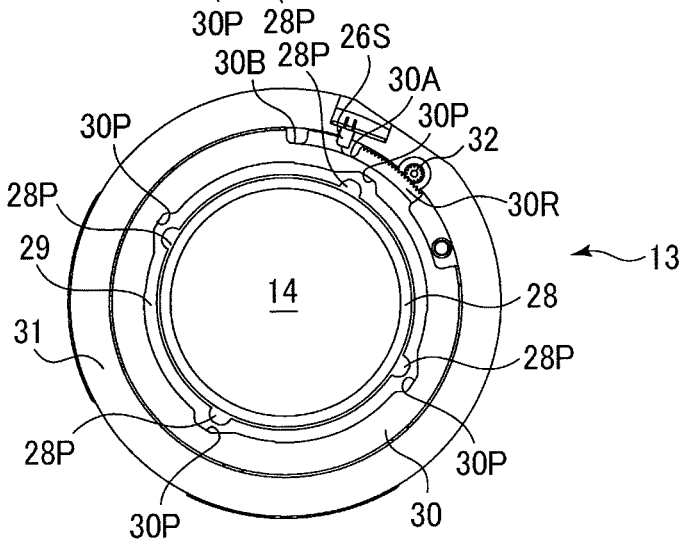
Figure 2C:
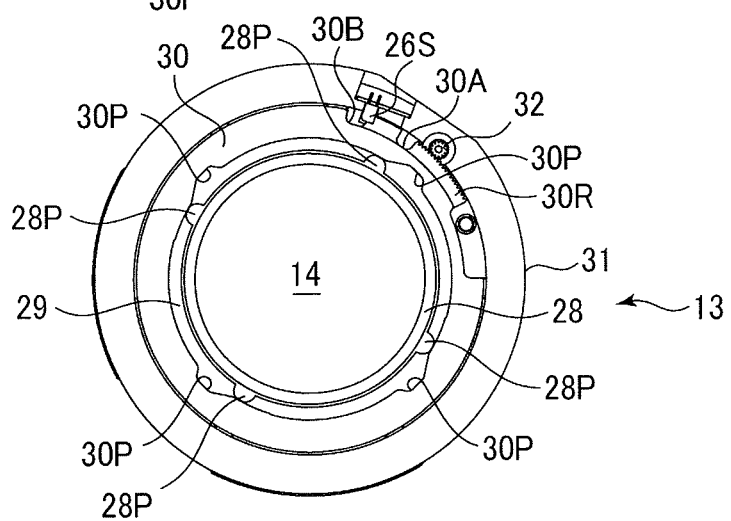

FIGS. 2A to 2C are external views of the blur correction mechanism 13 of the present embodiment. FIG. 2A is a perspective front view. FIG. 2B is a front view in an unlocked state and FIG. 2C is a front view in a locked state.

As illustrated in the drawings, the correction lens 14 is held by the movable portion 28, which has a circular frame, approximately at its center. For example, four protrusions 28P protruding outward in the radial direction are arranged on an outer circumference of the circular frame of the movable portion 28 approximately at equally spaced intervals along the outer circumference. A circular lock ring 30 is arranged at the periphery of the circular frame of the movable portion 28 to surround the circular frame. A circular clearance 29 is formed between the lock ring 30 and the circular frame.

The inner diameter of the lock ring 30 is arranged to have a dimension so that the respective protrusions 28P of the movable portion 28 make contact with the inner circumference of the lock ring 30 disregarding tolerance. Recesses 30P corresponding to the number of protrusions 28P are formed at the inner circumference lock ring 30, approximately at equally spaced intervals along the inner circumference. As described later, the recesses 30P in cooperation with the protrusions 28P define the range of motion of the correction lens 14 for blur correction.

The lock ring 30 is contained in a casing (fixed portion) 31 that has an approximately cylindrical external appearance and is rotatable about the optical axis L in the casing 31. Rotation of the lock ring 30 is performed by a rack-and-pinion mechanism which is arranged at the outer circumference of the lock ring 30, for example. That is, a rack 30R is arranged on the outer circumference of the lock ring 30 and is engaged with a pinion 32 that is arranged on the casing 31 side. The pinion 32 is driven by a stepping motor (not illustrated) which is fixed in the casing 31.

Cutouts 30A, 30B for detecting locking status from a rotational position of the lock ring 30 are arranged on the outer circumference of the lock ring 30. A photo-interrupter (lock detection sensor) 26S that is used in cooperation with the cutouts 30A, 30B is arranged in the casing 31. That is, light is detected by the photo-interrupter 26S through the cutout 30A in the unlocked state as illustrated in FIG. 2B, whereas light is detected through the cutout 30B in the locked state as illustrated in FIG. 2C.

Further, the movable portion 28 includes a plurality of flat plate portions 28A which extend from the circular frame outward in the radial direction, so that the coil for driving the movable portion 28 and the like are mounted thereon. In the casing 31, the front side and the back side of the flat plate portions 28A are supported by bearings (not illustrated), so that movement in the optical axis direction is restricted.

Figure 3A:
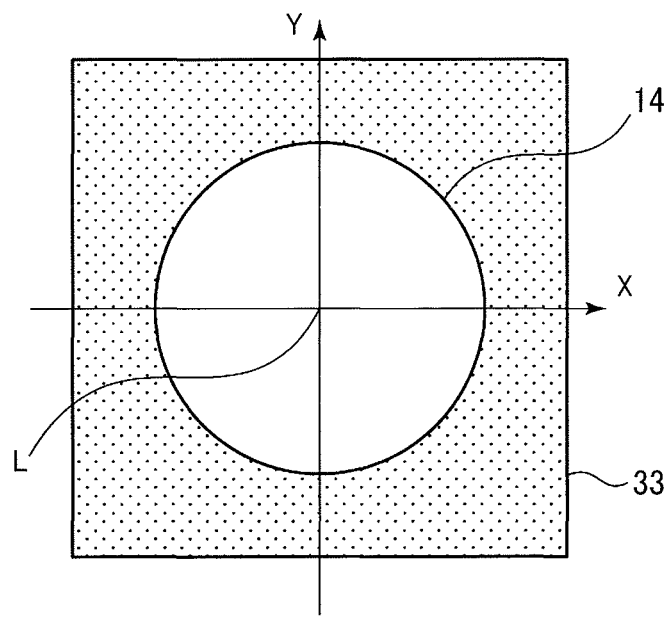
FIGS. 3A and 3B include views schematically illustrating the range of motion of a correction lens in an unlocked state and a locked state.
Figure 3B:
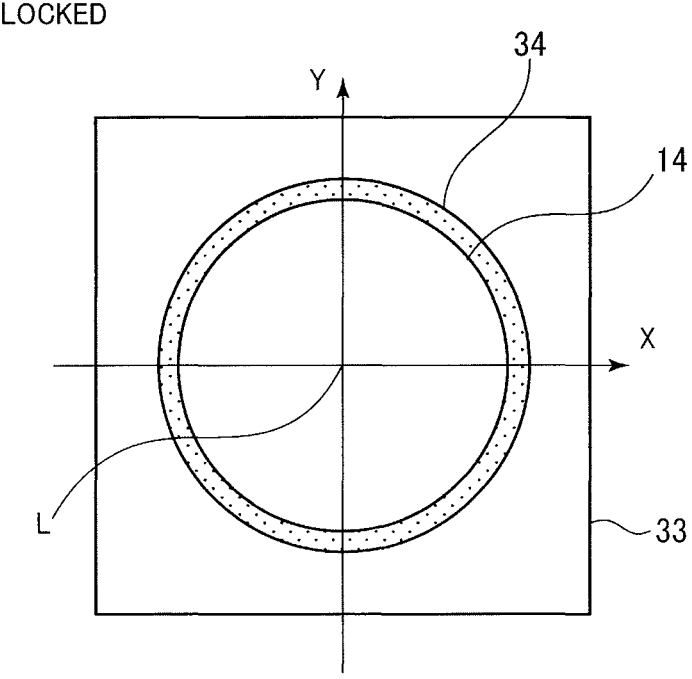

Next, the range of motion of the correction lens 14 in the present embodiment will be described with reference to FIGS. 2A to 2C, 3A, and 3B. FIGS. 3A and 3B are views schematically illustrating the range of motion of the correction lens 14 in the unlocked state and the locked state, respectively.

In the unlocked state of FIG. 2B, the lock ring 30 is positioned so that the protrusions 28P of the movable portion 28 are aligned with the recesses 30P, respectively. In this state, movement of the movable portion 28 is restricted by contact of the protrusions 28P with the side walls of the recesses 30P. Here, the range of motion of the correction lens 14 is denoted by a rectangular range (unlocked range of motion) 33 shaded in FIG. 3A. On the other hand, in the locked state of FIG. 2C, the lock ring 30 is rotated clockwise from the position of FIG. 2B, so that each protrusion 28P is in contact with an arc-shaped inner-circumferential surface of the lock ring 30. Accordingly, movement of the movable portion 28 upward, downward, rightward, or leftward is restricted, so that the correction lens 14 is fixed with its center being aligned with the optical axis L.

However, since tolerance exists between the protrusion 28P and the arc-shaped inner circumferential surface, the correction lens 14 is movable, even in the locked state, in a shaded circular range (locked range of motion) 34 centered on the optical axis L as illustrated in FIG. 3B.

Figure 4:
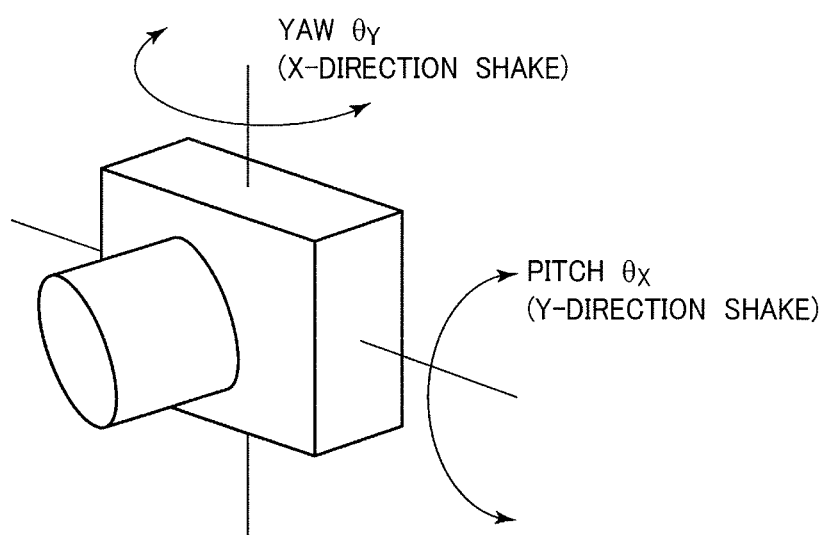
FIG. 4 is a perspective view schematically illustrating a relation between movement of a camera due to camera shake and the camera's X and Y axes of orientation.
Figure 5:
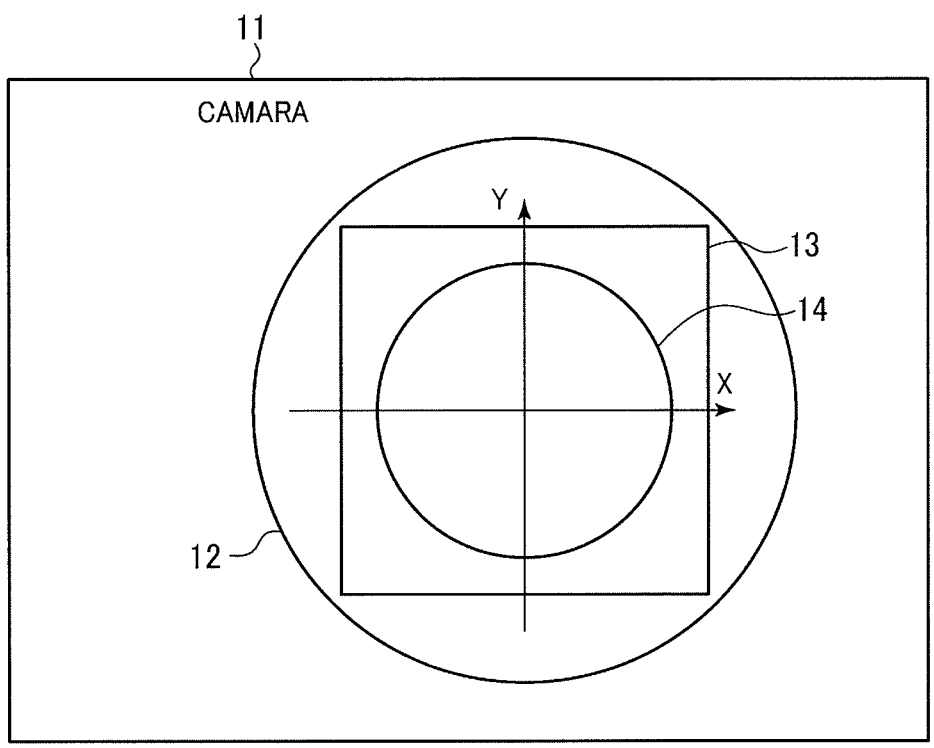
FIG. 5 is a front view illustrating a relation among a camera body, the correction lens, and the X and Y axes.

Next, a blur correction drive process of the present embodiment will be described in detail with reference to FIGS. 4 to 6. FIG. 4 is a perspective view schematically illustrating the movement of the camera due to camera shake with respect to the X and Y axes. FIG. 5 is a front view illustrating the relationship between the camera body 11 and the correction lens 14 with respect to the X and Y axes.

As illustrated in FIG. 4, during photography with the camera, rotation (yaw) about the vertical axis (Y axis) causes image blur in the horizontal direction (X-axis direction) and rotation (pitch) about the horizontal axis causes image blur in the vertical direction (Y-axis direction). Accordingly, shifting the correction lens 14 in the X-axis direction by a proper amount—as determined by detected rotational movement about the Y axis—can compensate for image blur in the X-axis direction. Likewise, shifting the correction lens 14 in the Y-axis direction by a proper amount—as determined by detected rotational movement about the X axis—can compensate for image blur in the Y-axis direction.

Figure 6:
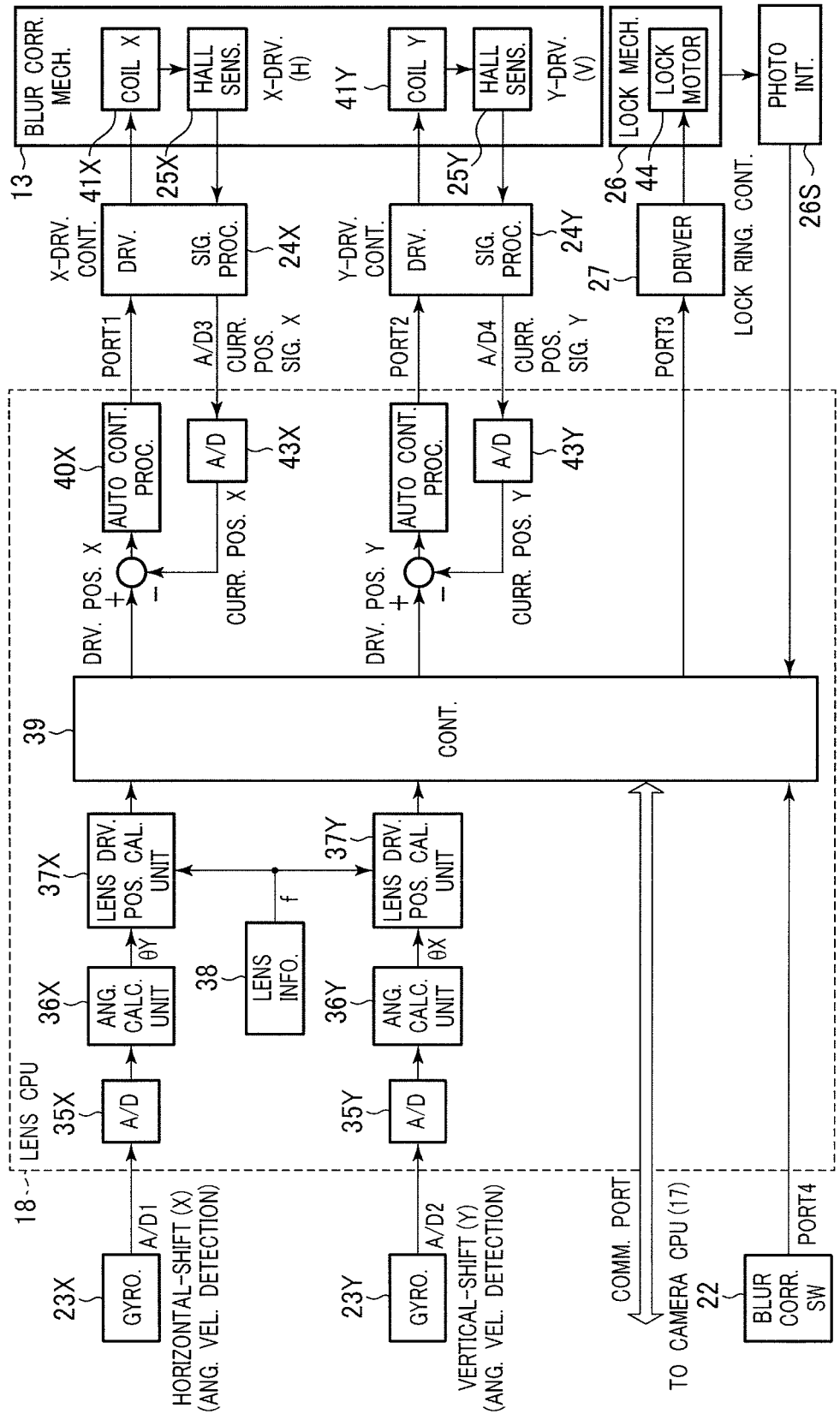
FIG. 6 is a block diagram of a blur correction control to be performed by a lens CPU.

FIG. 6 is a block diagram of the blur correction control performed by the lens CPU 18. The correction process is performed as an interruption process, for example, at predetermined time intervals (e.g., 1 ms).

Analog angular velocity signals about the Y axis and the X axis obtained by gyroscopes of the angular velocity sensors 23X, 23Y are input to A/D ports (A/D1, A/D2) of the lens CPU 18 and converted into digital signals by the A/D calculation units 35X, 35Y. The angular velocities about the Y axis and the X axis are integrated by angle calculation units 36X, 36Y to calculate rotational angles (a yaw angle θY and a pitch angle θX) about the Y axis and the X axis. The drive positions of the correction lens 14 in the X direction and Y direction for compensating against image blur are calculated by lens drive position calculation units 37X, 37Y based on the yaw angle, the pitch angle, and the lens information 38 such as the focal length f stored in a memory.

When the signal from the blur correction switch 22 input through a port 4 is ON, a controller 39 calculates the differences between the target position coordinates X, Y and the current position coordinates X, Y of the correction lens 14, where the target position of the correction lens 14 is defined by the drive position coordinate X in the X-axis direction and the drive position coordinate Y in the Y-axis direction, which are calculated by the lens drive position calculation unit 37X, 37Y. Automatic control processors 40X, 40Y perform processes such as a PID process thereon. Outputs of the automatic control processors 40X, 40Y are supplied to the X-direction drive controller 24X and the Y-direction drive controller 24Y through a port 1 and a port 2, respectively, to control current supplied to an X-direction coil 41X and a Y-direction coil 41Y arranged in the blur correction mechanism 13.

The position of the movable portion 28, that is, the current position coordinates of the correction lens 14 in the X-axis direction and the Y-axis direction, are calculated by the X-direction drive controller 24X and the Y-direction drive controller 24Y based on signals from the Hall sensors (position sensors) 25X, 25Y and input to the lens CPU 18 through A/D ports (A/D3, A/D4) as signals of current position coordinates X, Y. The signals are converted into the digital signals of the current position coordinate X and the current position coordinate Y by A/D calculation units 43X, 43Y and feedback thereof is performed as described above. Accordingly, when the blur correction switch 22 is ON, the target position of the correction lens 14, which corresponds to the drive position coordinates, is calculated based on the outputs of the angular velocity sensors 23X, 23Y and the correction lens 14 is driven in the X axis direction and the Y axis direction based on the above target values.

Here, based on the ON/OFF state of the blur correction switch 22, the lens CPU 18 rotates the lock ring 30 by driving a locking motor 44 such as a stepping motor, with the lock ring controller (driver) 27 connected to a port 3. That is, the position the lock ring 30 is switched between an unlocked position (FIG. 2B) and a locked position (FIG. 2C). The photo-interrupter (lock detection sensor) 26S detects whether the lock ring 30 is positioned in the unlocked position or the locked position.

Next, a main operation process performed by the camera CPU 17 and the lens CPU 18 will be described with reference to FIGS. 1, 6, 7, and 8. The processes of FIGS. 7 and 8 start when a main switch 19 on the camera body 11 is turned on. Note that in the following descriptions, the lens barrel 12 is attached to the camera body 11.

Figure 7:
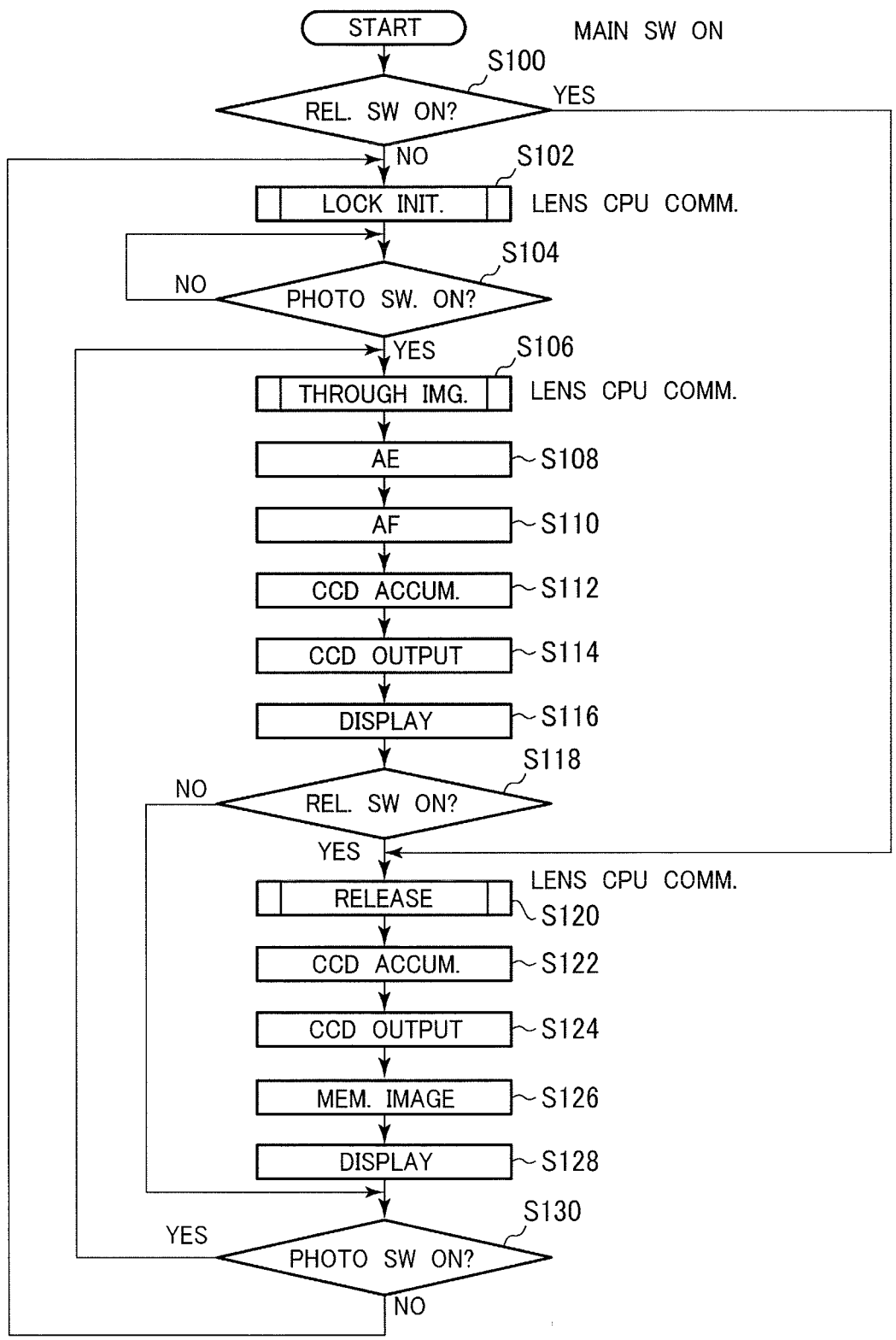
FIG. 7 is a flowchart of a main program to be performed by a camera CPU.

FIG. 7 is a flowchart for the camera CPU 17. In step S100, it is determined whether or not the release switch 21 is ON. When the release switch 21 is ON, the process proceeds to step S120. When the release switch 21 is not ON, communication between the camera CPU 17 the lens CPU 18 starts in step S102 and the lens CPU 18 is required to perform a locking initialization operation.

In step S104, it is determined whether or not the photometric switch 20 is ON. This process is repeated until the photometric switch 20 is turned on. When it is determined that the photometric switch 20 is ON, the process proceeds to step S106 where the camera CPU 17 establishes communication with the lens CPU 18 and informs the lens CPU 18 that the camera CPU 17 will start through-the-lens image operation.

In steps S108 to S116, capture and display of the through-the-lens image are carried out. That is, an AE process is performed in step S108 and an AF process is performed in step S110. In step S112, the imaging device (CCD) 16 accumulates charges based on a focus position set in step S110 and the exposure determined in step S108. Then, in step S114, for example, pixel signals accumulated in the imaging device (CCD) 16 may be read out and output as field images. In step S116, the output image signal is output to a monitor (not illustrated) and the through-the-lens image is displayed.

Next, in step S118, it is determined whether or not the release switch 21 is ON. When the release switch 21 is not ON, the process proceeds to step S130. When the release switch 21 is ON, the process continues to step S120 and the camera CPU 17 establishes communication with the lens CPU 18 and informs the lens CPU 18 that the camera CPU 17 will start a release process. In steps S122 to S128, a still image is photographed. That is, in step S122 the imaging device (CCD) 16 carries out charge accumulation based on the focus position set in step S110 and the exposure determined in step S108. Then, in step S124, for example, the charges accumulated in the imaging device (CCD) 16 for all of the pixels (a frame image) are read out. In step S126, the output image signal is stored in a non-volatile image memory (not illustrated). In step S128, the image is displayed on the monitor (not illustrated).

Next, in step S130, it is determined whether or not the photometric switch 20 is ON. When it is determined that the photometric switch 20 is ON, the process returns to step S106. When it is determined that the photometric switch 20 is not ON, the process returns to step S102 and the above processes are repeated until the main switch 19 of the camera body 11 is turned off or the camera enters a sleep mode.

Figure 8:
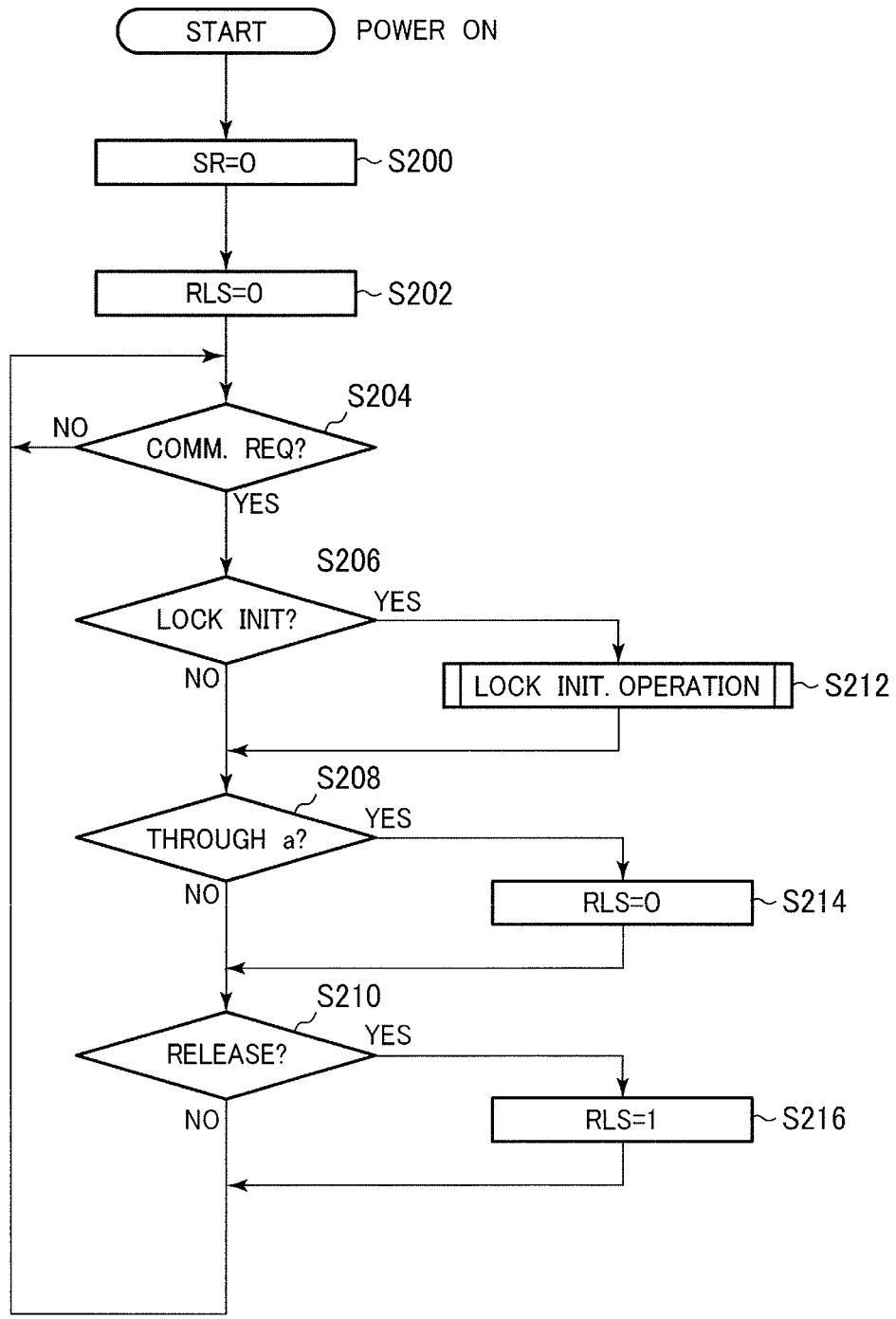
FIG. 8 is a flowchart of a main program to be performed by the lens CPU.

FIG. 8 is a flowchart for the lens CPU 18. In steps S200 and S202, initialization of a status register is performed. In step S200, initialization is performed on a flag SR which indicates the status of the blur correction control (blur correction status). In step S202, initialization is performed on an RLS flag which indicates the release status. That is, both SR and RLS are set to zero. Three statuses are indicated by the SR flag. When "SR=0", a locking process (initialization operation) for the lock ring 30 has already been performed. When "SR=1", the blur correction control is in an OFF state. When "SR=2", the blur correction control is in an ON state. Further, two statuses are indicated by the RLS flag. When "RLS=0", a through-the-lens image is displayed. When "RLS=1", a release operation is underway.

After the initialization of the SR and RLS flags is completed, in step S204, it is determined whether or not a communication request exists from the camera CPU 17. The determination is repeated until a communication request is received from the camera CPU 17. When a communication request from the camera CPU 17 is detected by the lens CPU 18, it is determined whether the communication is requesting locking initialization (request for a locking operation by the lock ring 30), informing of execution of a through-the-lens image display by the camera body 11, or informing of execution of a release operation in the camera body 11, respectively in steps S206, S208, and S210.

Figure 9:
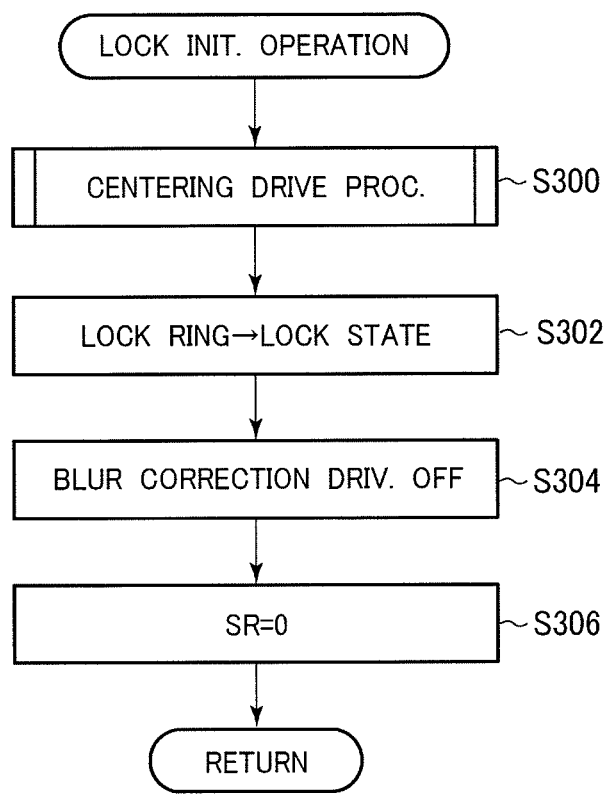
FIG. 9 is a flowchart of a lock initialization operation to be performed by the lens CPU.
Figure 11:
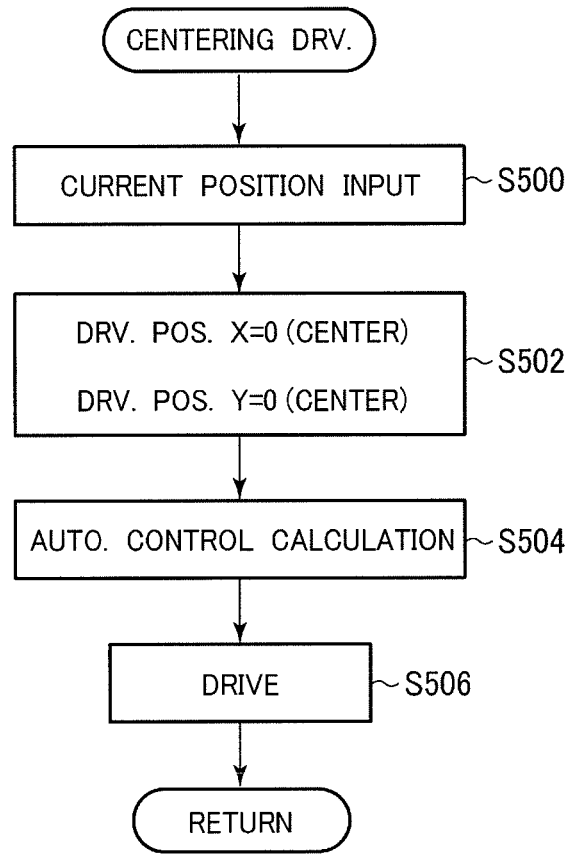
FIG. 11 is a flowchart of a centering drive process to be performed by the lens CPU.

In the case of a locking initialization request, the locking initialization operation indicated in FIG. 9 is performed in step S212. As illustrated in FIG. 9, the first part of the locking initialization operation is a centering drive process that is carried out in step S300 to align the correction lens 14 with the optical axis. As illustrated in the flowchart of FIG. 11, in the centering drive process the position of the correction lens 14 is detected based on the output of the Hall sensors 25X, 25Y (see FIG. 6) in step S500. Then, in step S502, the drive position (X, Y), which is the target position of the correction lens 14, is assigned the coordinates (0,0) by the controller 39 so that it corresponds to the optical axis and the center of the range of motion 33, 34 (see FIG. 3). Next, in steps S504 and S506, an automatic control calculation is performed based on the current position and the target position, and the correction lens 14 is moved to the center position (0,0) by driving the image blur correction mechanism 13 based on the calculation result.

Next, in step S302, the lock ring 30 is rotated to the locked position by driving a locking motor 44. In step S304, power supplied to the coils 41X, 41Y constituting an electromagnetic actuator is discontinued and driving of the correction lens 14 is stopped. In step S306, the SR flag indicating a blur correction status is set to satisfy "SR=0" to indicate that the locking initialization operation has been performed, and then the locking initialization operation is finished.

In a case that the communication from the camera CPU 17 is determined to be a notification to display a through-the-lens image in step S208, the RLS flag indicating the release status is set to satisfy "RLS=0" in step S214 to indicate that a through-the-lens image is being displayed. When the communication from the camera CPU 17 is determined to be a notification to perform release operation in step S210, the RLS flag indicating the release status is set to satisfy "RLS=1" to indicate that a release operation is being performed. The processes in steps S204 to S210 are repeated while the lens CPU 18 is powered ON.

Figure 10:
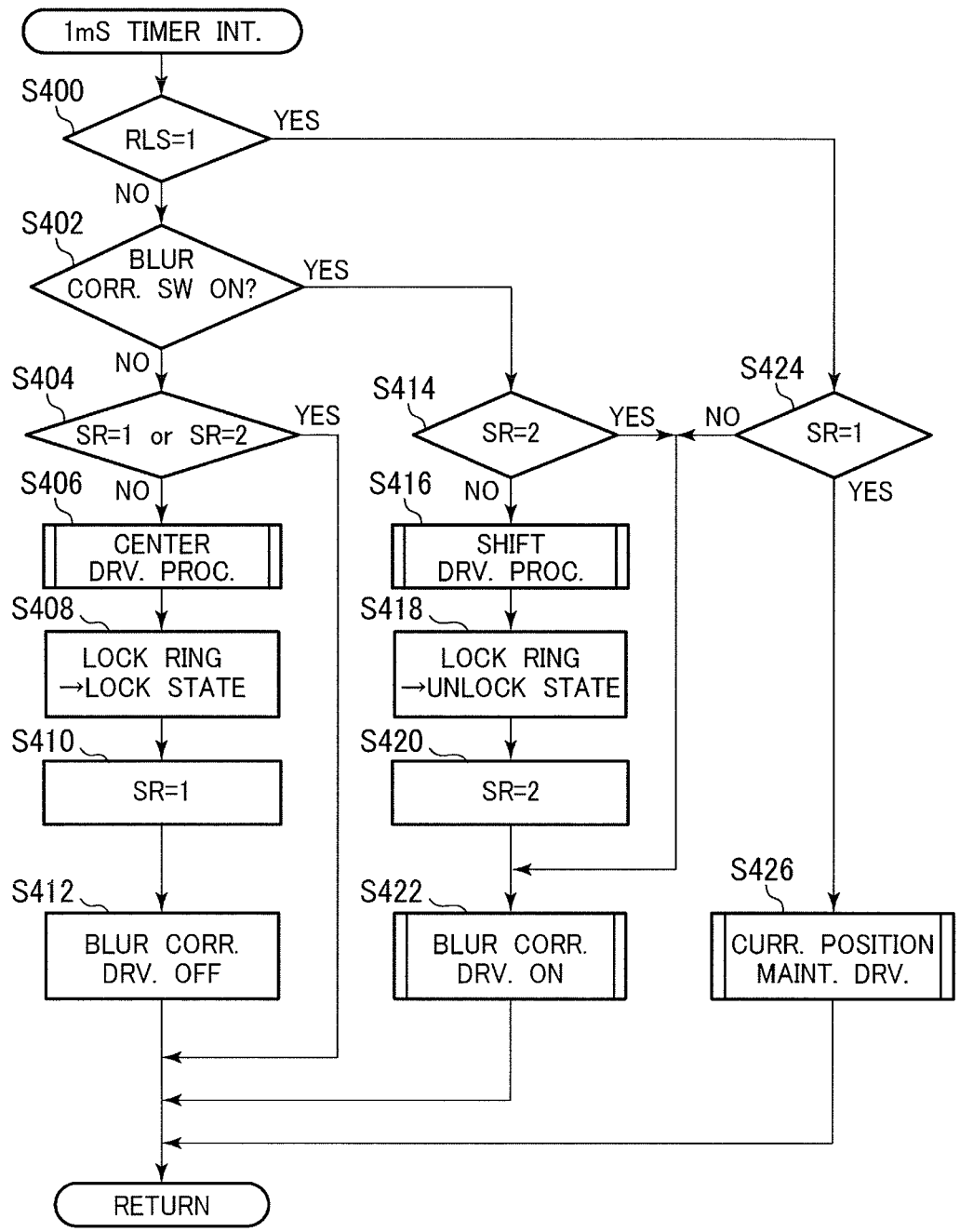
FIG. 10 is a flowchart of a timer interruption process with a cycle of 1 ms to be performed by the lens CPU in the first embodiment.

Further, the timer interruption process illustrated in the flowchart of FIG. 10 occurs in the lens CPU 18 with a cycle of 1 ms. In the following, a timer interruption process with a cycle of 1 ms will be described with reference to FIGS. 2, 6, 10, and 11.

In step S400 of the timer interruption process with a cycle of 1 ms, it is first determined whether or not the RLS flag satisfies "RLS=1", that is, whether or not the current status is under a release operation. When RLS≠1, which indicates that a release operation is not in effect, the process proceeds to step S402 and the ON/OFF state of the blur correction switch 22 is detected to determine whether or not the blur correction switch 22 is in an ON state.

When the blur correction switch 22 is in an OFF state, the process proceeds to step S404 where it is determined whether the SR flag satisfies "SR=1" or "SR=0", in other words whether blur correction is in the OFF state or in a state where the locking initialization operation is completed. When "SR≠1" and "SR≠0", that is, when the current status does not indicate that blur correction is in the OFF state and the locking initialization operation has not been performed, the centering drive process illustrated in the flowchart of FIG. 11 is performed in step S406 and the lock ring 30 (see FIG. 2) is rotated to the locked position by driving the locking motor 44 in step S408. This situation occurs when the blur correction switch 22 is switched from the ON state to the OFF state, namely when the status is still maintained as "SR=2". Namely, the correction lens 14 is not locked even though the blur correction is currently OFF, so that the correction lens 14 is locked in the above process.

In step S410, the flag SR indicating the blur correction status is set to satisfy "SR=1" to indicate that the blur correction is OFF. In step S412, power supply to the coils of the blur correction mechanism 13 (see FIG. 6) is stopped to terminate the blur correction operation and thereby the current timer interruption process ends. When it is determined in step S404 that "SR=1" or "SR=0", the timer interruption process immediately ends.

On the other hand, when it is determined that the blur correction switch 22 is in the ON state in step S402, it is determined whether or not the SR flag indicating the blur correction status satisfies "SR=2" in step S414. When it is determined that "SR=2", the blur correction is underway so that the process proceeds to step S422 and terminates the timer interruption process while continuing the blur correction drive process. When "SR≠2", the blur correction is in the OFF state and the lock ring 30 is in the locked state. In this case, a shift drive process (mentioned later) for the correction lens 14 is performed in step S416 and the lock ring 30 is rotated to be in the unlocked state in step S418. Then, after the SR flag of the blur correction status is set to satisfy "SR=2" (blur correction ON) in step S420, the blur correction process is started in step S422 and the timer interruption process is finished in step S422.

When the RLS flag of the release status satisfies "RLS=1" in step S400, that is, when it is determined that a release operation is underway, it is determined whether or not the SR flag of the blur correction status satisfies "SR=1 in step S424. When "SR=1", that is, when the blur correction is in the OFF state, a later-mentioned current position maintenance drive process is performed in step S426 and the timer interruption process is finished. On the other hand, when "SR≠1", that is, when it is determined that the blur correction status is in the ON state, the blur correction drive process is continued in step S422 and the timer interruption process is finished.

Figure 12:
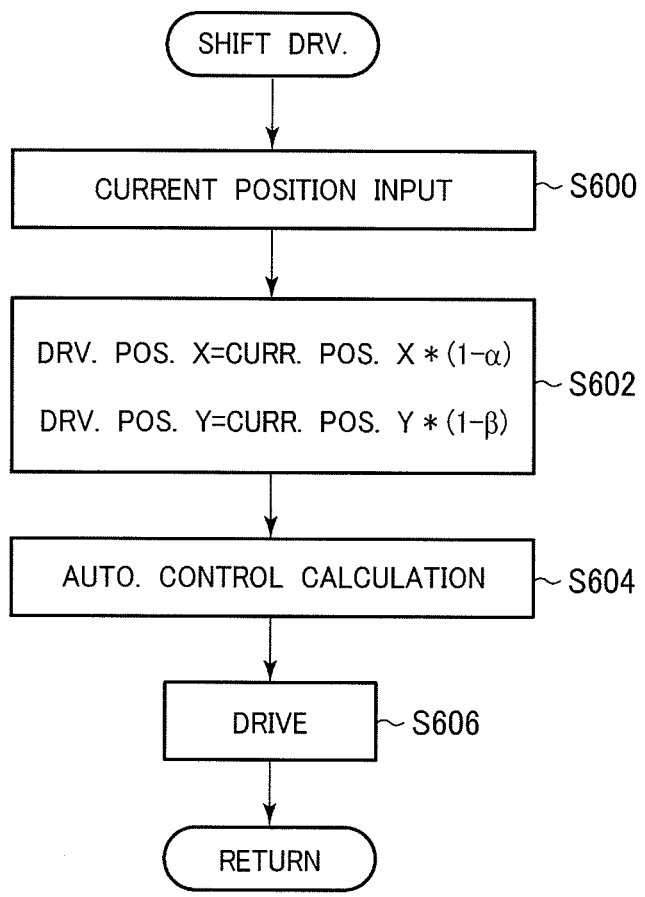
FIG. 12 is a flowchart of a shift drive process to be performed by the lens CPU.
Figure 13A:
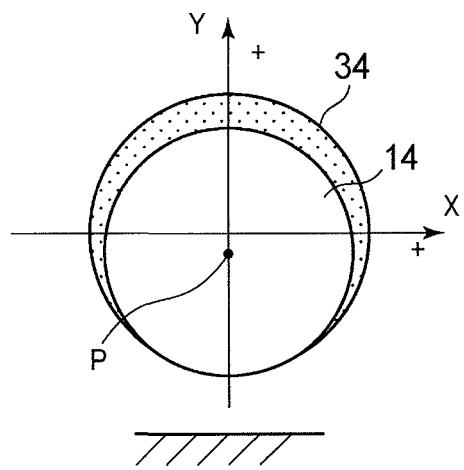
FIGS. 13A-13D include schematic views illustrating four states in which the correction lens is deviated by gravity within a locked range of motion.
Figure 13B:
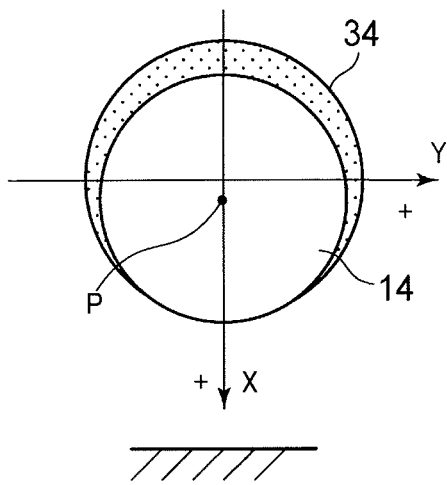
Figure 13C:
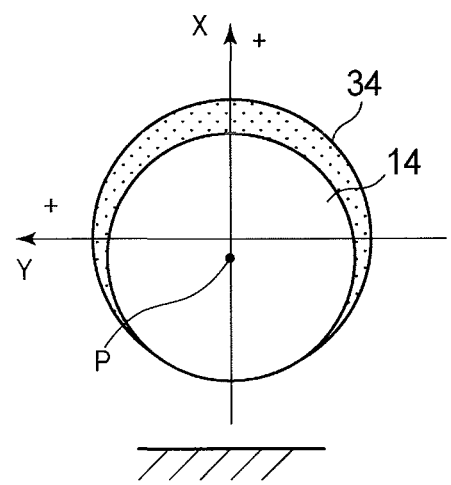
Figure 13D:
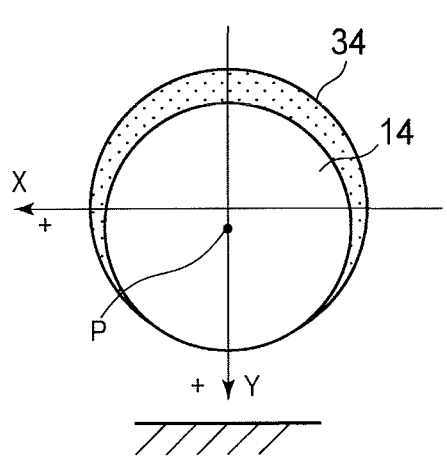

Next, the shift drive process of step S416 (see FIG. 10) will be described with reference to FIGS. 2, 3, 6, and 12. Here, FIG. 12 is a flowchart of the shift drive process of step S416.

When the lock ring 30 is in the locked position (FIG. 3B), the four protrusions 28P arranged on the circular frame of the movable portion 28 are in contact with the arc-shaped inner circumferential surface of the lock ring. However, since tolerance exists therebetween, the correction lens 14 is movable in the locked range of motion 34 illustrated in FIG. 3B. Here, the correction lens 14 drops in the direction of gravitational force when the blur correction is in the OFF state, so that the protrusion 28P is in contact with the lock ring 30. Therefore, to eliminate frictional resistance due to contact of the protrusion 28P at the time of unlocking, the protrusion 28P of the movable portion 28 is required to be apart from the lock ring 30 similarly to the locking initialization operation. However, when the centering drive process (see FIG. 11) is performed as the locking initialization operation and the correction lens 14 is moved to the center of the range of motion 33, 34, the movement includes unnecessary motion and it takes more time to release the lock.

In the present embodiment, the shift drive process for the correction lens 14 (movable portion 28) is performed in step S416 instead of the centering drive process of FIG. 11. In the shift drive process, first, the current position coordinates X, Y of the correction lens 14 are obtained based on the outputs of the Hall sensors 25X, 25Y in step S600. In step S602, the drive position coordinates X, Y of the correction lens 14 are calculated with the following equations and set as the target position coordinates by the controller 39.

drive position $X$=(current position $X$)×(1−α)

drive position $Y$=(current position $Y$)×(1−β)

Here, α and β are simply required to be less than 1.0, but may be 0.5 or less. It is preferable that α and β are approximately in a range between 0.05 and 0.2. That is, shift drive amounts ΔX, ΔY in the X-axis direction and the Y-axis direction from the current positions X, Y are obtained as "ΔX=−(current position X)×α" and "ΔY=−(current position Y)×β, respectively. In the present embodiment, for example, both α and β are set to be 0.1. That is, in the shift drive process of the present embodiment, the correction lens 14 is moved by 10% of the current position coordinates X, Y in −X and −Y directions along the X and Y axes, with the center of the range of motion 33, 34 (i.e., optical axis) being the coordinate origin and the position of the correction lens 14 being the lens center thereof. The above corresponds to the situation when the correction lens 14, which is shifted downward in the direction of gravitational force, is nudged toward the center by the order of 10% of the deviation distance.

In step S604, an automatic control calculation is performed with reference to the drive position coordinates X, Y calculated in step S602. In step S606, the correction lens 14 is moved to the drive position coordinates X, Y by driving the movable portion 28, and then, the shift drive process is finished.

Here, as illustrated in FIGS. 13A to 13D, the direction in which the correction lens 14 is displaced due to gravitational force varies in accordance with the orientation of the camera. However, by using the equations to define the abovementioned drive position coordinates X, Y, the same simple expressions can be adopted for any case regardless of the direction of gravitational force. In FIG. 13, point P denotes the center position of the deviated correction lens 14 and corresponds to the current position coordinates X, Y in each case.

Figure 14:
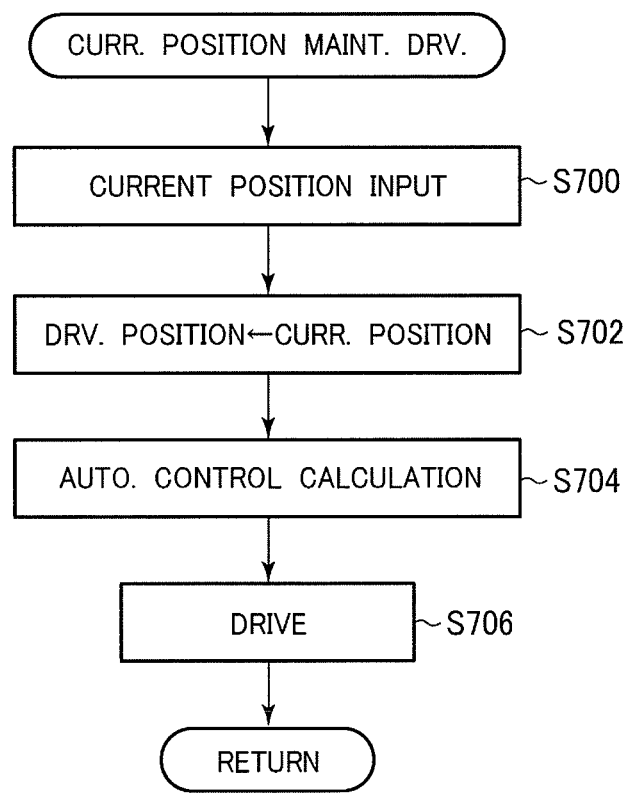
FIG. 14 is a flowchart of a current position maintenance drive process to be performed by the lens CPU.

Next, the current position maintenance drive process to be performed in step S426 of FIG. 10 will be described with reference to FIG. 14. The current position maintenance drive process is performed when the release operation is started while the blur correction is in the OFF state. When the blur correction is in the OFF state, the release operation is normally performed while photography is conducted in a stable state, such as when the camera is mounted on a tripod, so that the correction lens 14 is in the locked state. However, as described above, since the correction lens 14 is movable in the locked range of motion 34 even in the locked state, the correction lens 14 can be moved during photography due to vibration that may be caused by a release operation, and this may deteriorate the resolution of the image.

Therefore, in the present embodiment, when a release operation is performed while the blur correction is in the OFF state, photography is carried out with the correction lens 14 being electromagnetically suspended in the current position using the blur correction mechanism before any vibrations can be caused by mechanical operations, such as a shutter operation or mirror-up operation. Namely, the current position coordinates X, Y of the correction lens 14 are obtained based on the signals of the Hall sensors 25X, 25Y in step S700 and the drive position coordinates X, Y are set to the current position coordinates X, Y by the controller 39 in step S702. An automatic control calculation is performed based on the set drive position coordinates X, Y in step S704 and the blur correction mechanism 13 is driven based thereon in step S706. Namely, the correction lens 14 is electromagnetically locked in the current position. In the present embodiment, the above process is performed when the release switch 21 is turned on. However, the above process can also be performed when a photometric switch is turned on with half depression of a release button.

Figure 15:
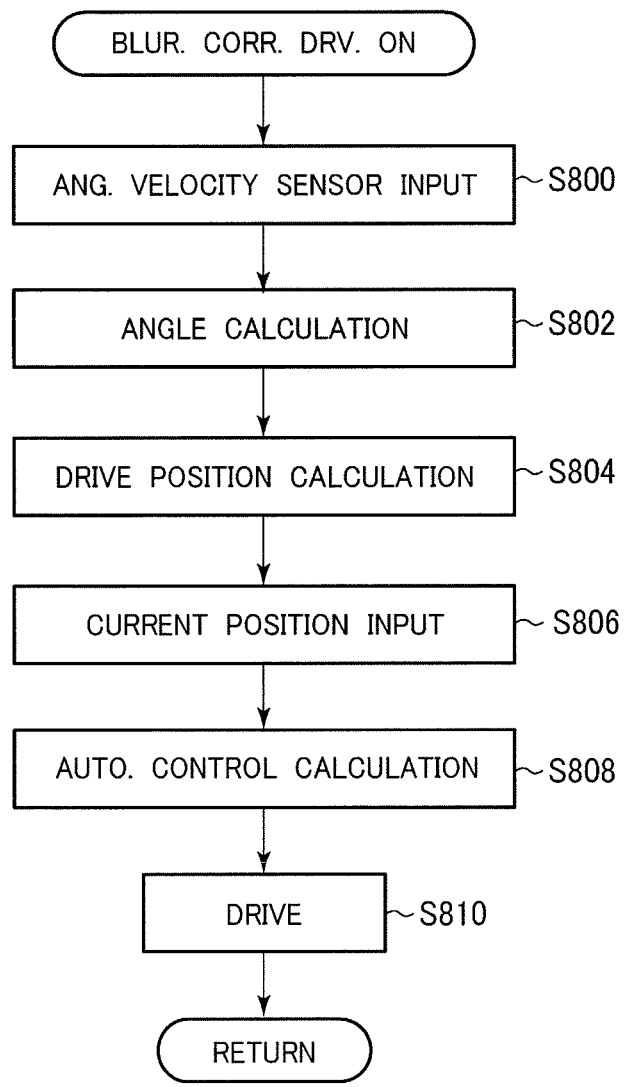
FIG. 15 is a flowchart of a blur correction drive process.

Next, the blur correction drive process to be performed in step S422 of FIG. 10 will be described with reference to FIGS. 1 and 6, and FIG. 15, which is a flowchart of the blur correction drive process.

In the blur correction drive process, first, angular velocity signals about the Y axis and the X axis are obtained from the angular velocity sensors (gyroscopes) 23X, 23Y in step S800. Rotational angles about the Y axis and the X axis are calculated by the angle calculation units 36X, 36Y in step S802. In step S804, the drive position coordinates X, Y are calculated by the lens drive position calculation units 37X, 37Y (controller 39) based on the rotational angles calculated in step S802, lens focal length f, and the like. In step S806, the current position coordinates X, Y of the correction lens 14 are obtained by the X-direction drive controller 24X and the Y-direction drive controller 24Y based on the signals from the Hall sensors 25X, 25Y. According to the automatic control calculation in step S808, manipulation variables are calculated by the automatic control calculation processors 40X, 40Y from the difference between the drive position coordinates X, Y and the current position coordinates X, Y. Based on the manipulation variables, electric power is supplied to the X-direction coil 41X and the Y-direction coil 41Y by the X-direction drive controller 24X and the Y-direction drive controller 24Y to drive the blur correction mechanism 13.

As described above, according to the structure of the first embodiment, since a movable portion is not supported to a fixed portion by an elastic support member such as an elastic body, blur correction can be performed more efficiently. Meanwhile, according to such a structure, since the movable portion is not supported by an elastic support member, the weight of the movable portion including a correction lens is supported entirely by a locking mechanism (lock ring) via a contact portion (protrusions) when the blur correction control is in the OFF state, and such contact will interfere with an unlocking operation. However, in the first embodiment, since a shift drive process is used to separate the movable portion from the locking mechanism (lock ring) when a mechanical locking mechanism is being unlocked, unlocking can be easily performed without excessive frictional force at the time of unlocking. Further, in the present embodiment, since the correction lens is moved only slightly with the shift drive process, it is possible to reduce the amount of time until rotation of the locking mechanism (lock ring) can be started. Accordingly, rapid unlocking can be performed.

Further, in the present embodiment, a small shift can be calculated with a simple expression, and a shift drive of the correction lens can be carried out by adopting only the structure of a conventional blur correction mechanism, regardless of a gravity sensor and the orientation of the camera body. Further, the present embodiment is effective when a large amount of friction is caused by the weight of the movable portion applied against the lock ring (locking member).

Further, according to the present embodiment, when a release operation is performed when blur correction is in the OFF state and the movable portion is mechanically locked, the movable portion is electromagnetically locked in the position thereof using the blur correction mechanism. Accordingly, the correction lens can be prevented from making any movements within a range of motion due to the tolerance of the mechanical locking mechanism when vibration is caused by a release operation, so that deterioration in the resolution of a photographed image can be prevented. Further, since the electromagnetic locking is performed only during the release operation, it is possible to suppress unnecessary power consumption.

Next, a second embodiment of the present invention will be described with reference to FIGS. 16 to 18. The second embodiment is different from the first embodiment in that the shift drive process in steps S416 and S418 of FIG. 10 is replaced with a sinusoidal-drive unlocking process. The rest of the structure is the same as that of the first embodiment. In the following, the same reference numbers have been assigned to the same structures and the descriptions thereof will not be repeated.

Figure 16:
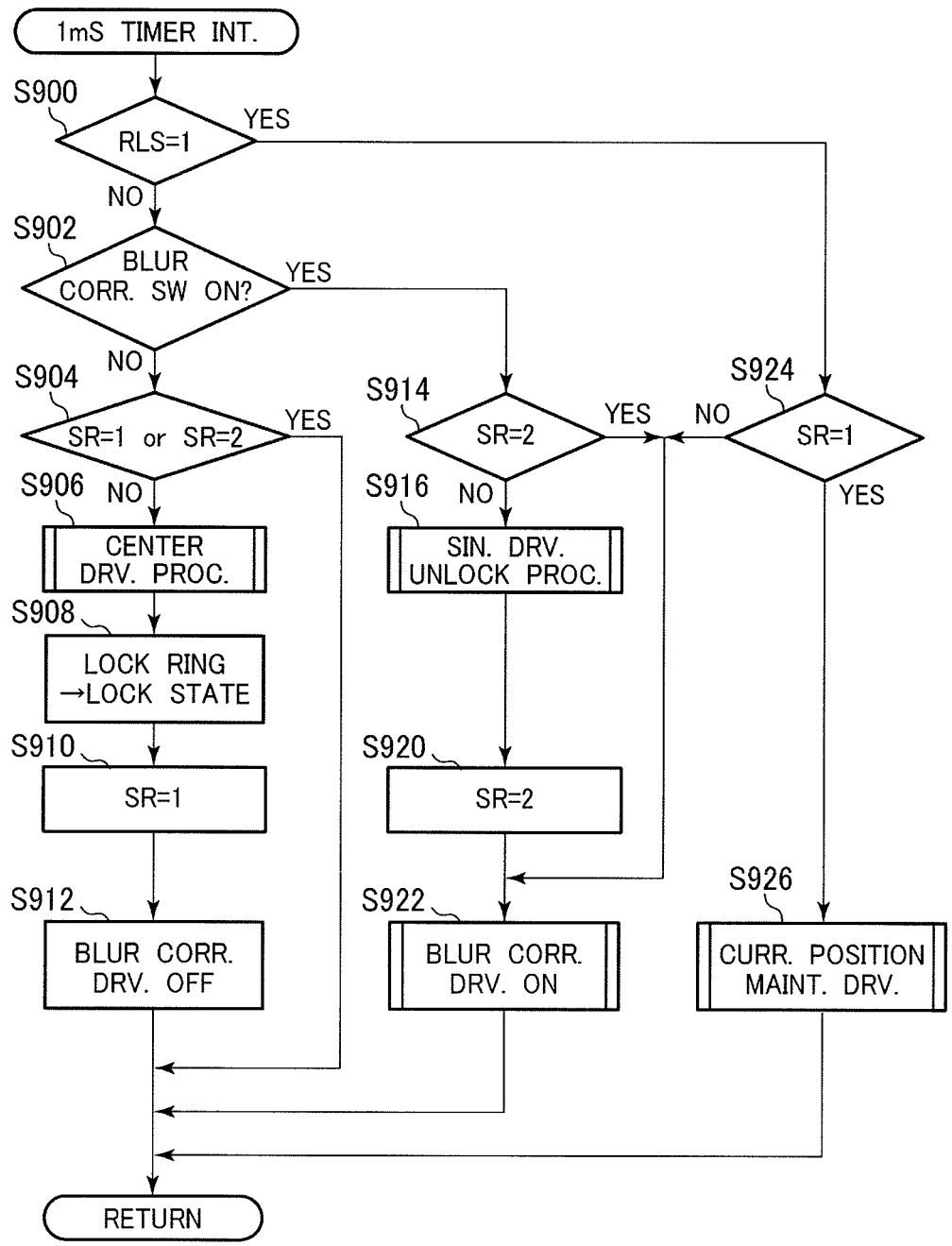
FIG. 16 is a flowchart of a timer interruption process with a cycle of 1 ms to be performed by the lens CPU in the second embodiment.

FIG. 16, which corresponds to FIG. 10 of the first embodiment, is a flowchart of a timer interruption process with a 1 ms cycle time that is performed by the lens CPU 18 in the second embodiment.

In the flowchart of FIG. 16, steps S900 to S914 and steps S920 to S926 correspond to steps S400 to S414 and steps S420 to S426 in FIG. 10, and processes thereof are also similar thereto. Meanwhile, in step S916 of the second embodiment, the process of steps S416 and S418 of FIG. 10 is replaced with the sinusoidal-drive unlocking process (gradual unlocking process). In the first embodiment, the correction lens 14, which has been shifted downward in the direction of gravitational force, is moved toward the center in the unlocking process by a small distance equal to 10% of the deviation amount. In contrast, in the second embodiment, similarly to the centering drive of step S406, the center of the correction lens 14 is moved to the center (optical axis) of the range of motion 33, 34 in accordance with a later-mentioned sinusoidal-drive process.

A method of moving the correction lens 14 to the center position in the sinusoidal-drive unlocking process (gradual unlocking process) of the second embodiment will be described with reference to FIG. 17.

Figure 17:
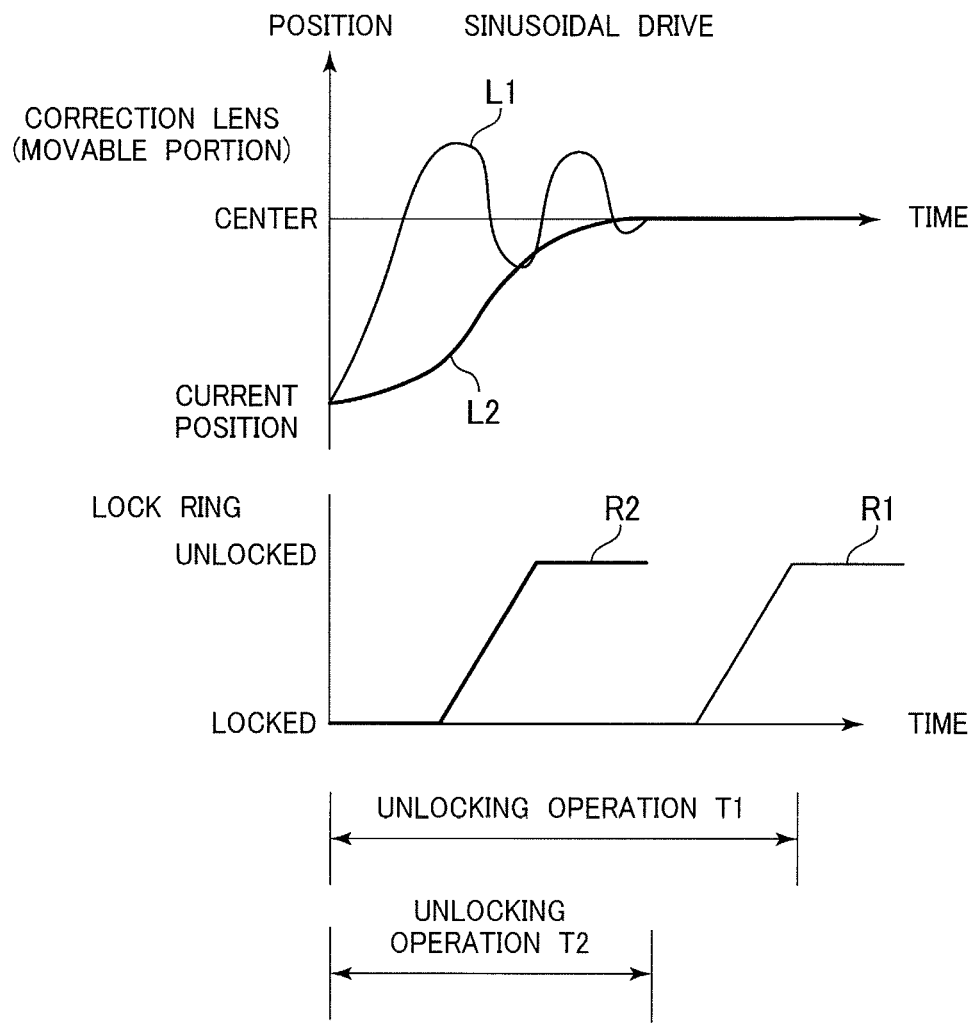
FIG. 17 is a graph indicating positional movement of the correction lens and timing of unlocking in a sinusoidal-drive unlocking process (gradual unlocking process) of the second embodiment.

FIG. 17 is a graph indicating positional changes of the correction lens 14 (movable portion 28) with the centering drive processes of steps S406 and S906 and the timing of switching between the locked position and the unlocked position of the lock ring 30. Curved line L1 indicates a temporal change of the position of the correction lens 14 (movable portion 28) with the centering drive process. Curved line L2 indicates a temporal change of the position of the correction lens 14 (movable portion 28) with the sinusoidal-drive unlocking process. Curved line R1 indicates the movement of the lock ring 30 from the locked position to the unlocked position when the centering drive process is performed. Curved line R2 indicates the movement of the lock ring 30 from the locked position to the unlocked position when the sinusoidal-drive unlocking process is performed.

In the centering drive process, the drive position coordinates X, Y designate the target position for the movement control of the correction lens 14 and are set as the origin (0, 0), which is the center position (optical axis) of the range of motion. The correction lens 14 is then moved to the center position with an automatic control calculation such as PID. As illustrated by the curved line L1, fluctuation occurs as the correction lens 14 converges toward the center position. Here, the unlocking operation is performed after the correction lens 14 is moved to the center position and time T1 is required for unlocking.

In contrast, in the sinusoidal-drive unlocking process, the drive position coordinates X, Y designating the target values are gradually approximated to the center position. Accordingly, the correction lens 14 is also moved toward the center position using the drive position coordinates X, Y. In the present embodiment, the correction lens 14 is controlled to be moved toward the center position along crest-to-trough or trough-to-crest (peak-to-peak) intervals that are one half cycle of a sine wave. Here, the unlocking operation of the lock ring 30 is started, for example, at a phase in a range between 0° and 90° (before arriving at the halfway point of the distance from the initial position to the center) and the lock ring 30 is moved to the unlocked position before movement of the correction lens 14 to the center position is completed. That is, time T2 required for unlocking is equivalent to the time required for moving the correction lens 14 to the center position. Incidentally, the time required for moving the correction lens 14 to the center position is approximately the same in both the centering drive process and the sinusoidal-drive unlocking process.

In the centering drive process, since the correction lens 14 vibrates before arriving at the center position, there is a possibility that the protrusion 28P of the movable portion 28 makes contact with the lock ring 30. Accordingly, the unlocking operation is performed after the centering drive process is completed. In contrast, in the sinusoidal-drive unlocking process (gradual drive unlocking process), since the correction lens 14 gradually approaches the center position, the protrusions 28P of the movable portion 28 do not make contact with the lock ring 30 provided that the correction lens 14 is approximated to the center at a predetermined distance therefrom. Accordingly, it is possible to start the unlocking operation during movement of the correction lens 14, so that time required for unlocking can be shortened.

Figure 18:
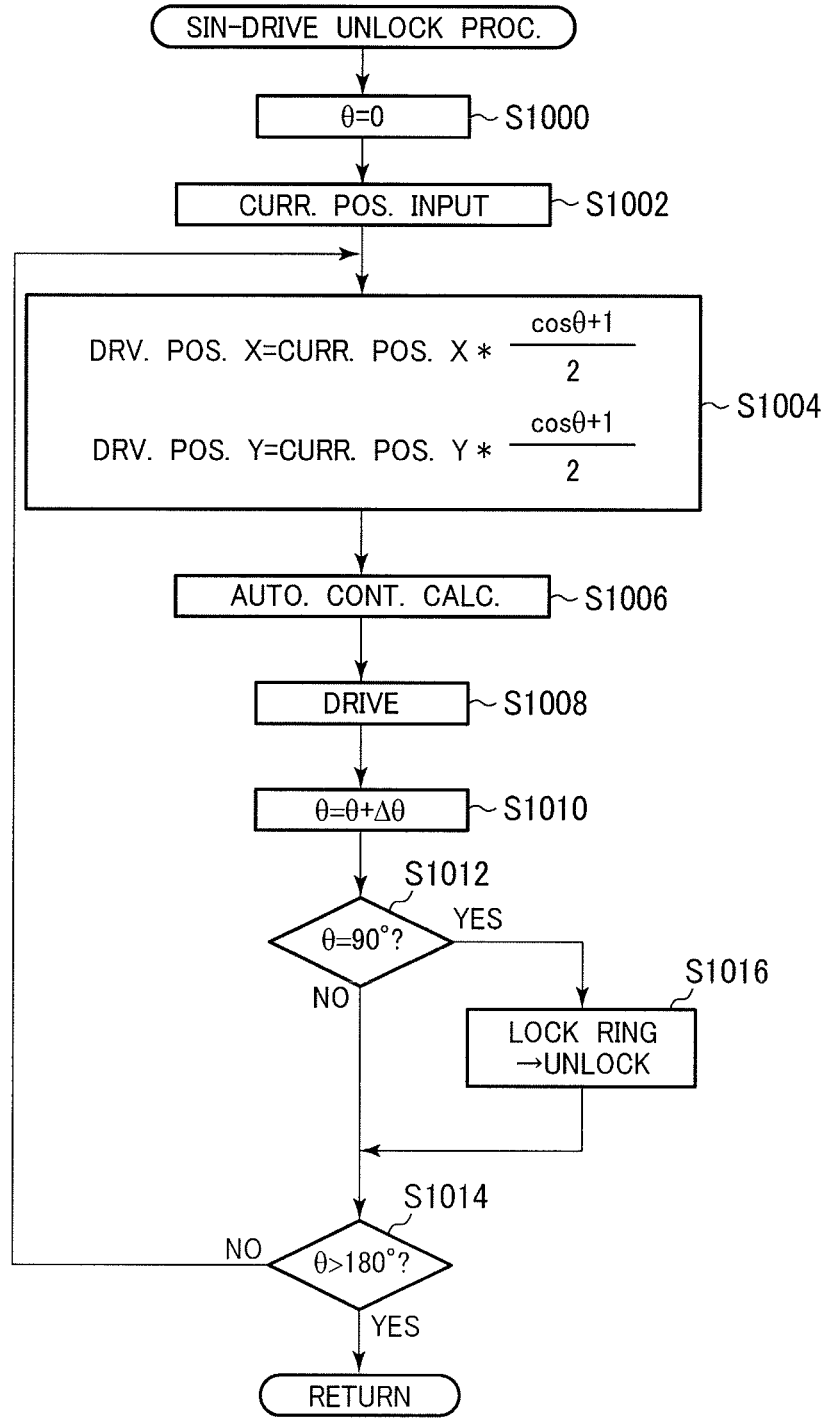
FIG. 18 is a flowchart of the sinusoidal-drive unlocking process (gradual unlocking process).

FIG. 18 is a flowchart of the sinusoidal-drive unlocking process (step S916 in FIG. 16) of the present embodiment. In the sinusoidal-drive unlocking process, first, a phase θ is initially set to 0 in step S1000. In step S1002, the current position coordinates X, Y of the correction lens 14 are obtained using the Hall sensors 25X, 25Y. In step S1004, values of the drive position coordinates X, Y are obtained based on the current position coordinates X, Y (initial position) and the phase θ. That is, the values of the drive position coordinates X, Y are calculated with the following equations.

$$\text{drive position } X = (\text{current position } X) \times (\cos θ + 1)/2$$

$$\text{drive position } Y = (\text{current position } Y) \times (\cos θ + 1)/2$$

In step S1006, an automatic control calculation is performed based on the current drive position coordinates X, Y. In step S1008, the correction lens 14 is moved to the calculated drive position with coordinates X, Y. In step S1010, the value of the phase θ is updated to θ+Δθ. Here, θ denotes a phase angle having the unlocking time T2 of a half cycle and an increment Δθ may be 1. However, the value of Δθ may be larger than 1 or smaller than 1 as long as it is a positive value.

Next, in step S1012, it is determined whether or not the value of θ arrives at a predetermined value such as 90°. The predetermined value (e.g., 90°) specifies the timing when the unlocking operation of the lock ring 30 is started. When "θ=the predetermined value (e.g., 90°)" is satisfied, the unlocking operation is started in step S1016. In other cases, in step S1014, it is determined whether or not "θ>180°" is satisfied, that is, whether or not the movement is completed.

When "θ>180°" is not satisfied, that is, when movement to the center position is not completed, the process returns to step S1004 so that the new drive position coordinates X, Y are calculated based on the value of θ updated in step S1010 and the initial position coordinates X, Y, and then, the similar processes are repeated. On the other hand, when it is determined that "θ>180°" is satisfied in step S1014, the process is finished.

In the present embodiment, the drive positions X, Y follow a sine wave path. However, it is only required that the distance from the initial position (current position) to the center position varies against time with a monotonically decreasing function, that is, movement is performed so that the distance to the center is always smaller than the previous distance thereto. It is preferable to arrive at the center position particularly in the latter half, with the use of gradual acceleration.

Further, gradual acceleration is preferable in the first half. For example, in the latter half the movement speed decelerates with time.

As described above, according to the second embodiment, it is possible to obtain effects similar to those of the first embodiment. In the second embodiment, the unlocking time is slightly longer than that of the first embodiment. However, since the correction lens is smoothly moved to the center position, it is possible to prevent uncomfortable image blur occurring in a through-the-lens image during unlocking.

In the above description, the present embodiment is applied to a lens-shift type of blur correction mechanism as an example. However, the present invention can be applied to a blur correction mechanism that uses an image sensor shift. Further, the present invention can be applied to a mirror-less camera, a camera with a non-replaceable lens, and a camera having only a finder without an image display monitor. For example, in the structure with only a finder, the fact that a photometric switch has been turned on is the only information supplied to the lens CPU in step S106, and the processes of steps S108 to S116 are eliminated. Further, in the present embodiment, descriptions are provided as exemplifying a digital camera. However, the present invention can be applied to a silver film camera as well.

In the present embodiment, the lock ring is adopted as the locking member. However, the present invention is not restricted to a locking mechanism of the type discussed in the present embodiment. For example, a locking mechanism including a pin member that is inserted into a hole formed in a movable portion may also be adopted.

Although the embodiment of the present invention has been described herein with reference to the accompanying drawings, obviously many modifications and changes may be made by those skilled in this art without departing from the scope of the invention.

The present disclosure relates to subject matter contained in Japanese Patent Application No. 2012-203594 (filed on Sep. 14, 2012), which is expressly incorporated herein, by reference, in its entirety.

The invention claimed is:

1. A blur correction apparatus, comprising:
   a blur correction mechanism that compensates for camera shake by driving a movable portion provided with one of a correction lens and an imaging device;
   a locking member which restricts movement of the movable portion within a locked range of motion;
   a shift drive processor which moves the movable portion a predetermined distance toward a center of the locked range of motion when locking by the locking member is released, the predetermined distance being shorter than the distance from the movable portion to the center; and
   an unlocking driver which moves the locking member to an unlocked position after moving the movable portion the predetermined distance away from the locking member;
   wherein the movable portion is suspended in a current position by the blur correction mechanism when a release operation is performed in a state in which the movable portion is locked by the locking member.

2. The blur correction apparatus according to claim 1, wherein the predetermined distance is equal to or less than 50% of the distance from the movable portion to the center.

3. The blur correction apparatus according to claim 1, wherein the shift drive processor is activated when blur correction starts.

4. The blur correction apparatus according to claims 1, wherein the movable portion includes a circular frame portion;

the locking member is a lock ring which surrounds the periphery of the circular frame portion;

a plurality of protrusions are arranged on an outer circumference of the circular frame portion;

a plurality of recesses corresponding to the plurality of protrusions are arranged on a circular inner circumference of the lock ring;

the lock ring is movable between a locked position and the unlocked position;

in the locked position, movement of the movable portion is restricted by contact between the protrusions and the circular inner circumference; and in the unlocked position, the protrusions are aligned with the recesses so that the movable portion is made movable for blur correction.

5. A lens barrel, comprising:

a blur correction mechanism which compensates for camera shake by driving a movable portion provided with a correction lens;

a locking member which restricts movement of the movable portion within a locked range of motion;

a shift drive processor which moves the movable portion a predetermined distance toward a center of the locked range of motion when locking with the locking member is released, the predetermined distance being less than the distance from the movable portion to the center; and an unlocking driver which moves the locking member to an unlocked position after moving the movable portion by the predetermined distance away from the locking member;

wherein the movable portion is suspended in a current position by the blur correction mechanism when a release operation is performed in a state in which the movable portion is locked by the locking member.

6. The blur correction apparatus according to claim 1, wherein one of a centering drive process, a shift drive process, and a sinusoidal drive unlocking process is performed when the blur correction is in an OFF state.

7. The lens barrel according to claim 5, wherein one of a centering drive process, a shift drive process, and a sinusoidal drive unlocking process is performed when the blur correction is in an OFF state.

* * * * *